US009220254B2

(12) United States Patent
Dong et al.

(10) Patent No.: US 9,220,254 B2
(45) Date of Patent: Dec. 29, 2015

(54) BED BUG TRAP OR BARRIER SURROUNDING A BED

(76) Inventors: Dahai Dong, Princeton Jct, NJ (US); Eugene Chang, Cerritos, CA (US); Bibo Xu, Belle Mead, NJ (US)

( * ) Notice: Subject to any disclaimer, the term of this patent is extended or adjusted under 35 U.S.C. 154(b) by 806 days.

(21) Appl. No.: 13/238,268

(22) Filed: Sep. 21, 2011

(65) Prior Publication Data
US 2013/0067796 A1 Mar. 21, 2013

(51) Int. Cl.
*A01M 1/14* (2006.01)
*A01M 29/34* (2011.01)
*A01M 29/30* (2011.01)
*A01M 29/00* (2011.01)
*A47G 9/02* (2006.01)
*A01M 1/10* (2006.01)

(52) U.S. Cl.
CPC ............... *A01M 1/14* (2013.01); *A01M 1/103* (2013.01); *A01M 29/00* (2013.01); *A01M 29/30* (2013.01); *A01M 29/34* (2013.01); *A47G 9/02* (2013.01); *A47G 9/0238* (2013.01); *A47G 9/0246* (2013.01)

(58) Field of Classification Search
CPC ......... A01M 1/00; A01M 1/10; A01M 1/103; A01M 1/14; A01M 29/00; A01M 29/30; A01M 29/34; A47G 9/02; A47G 9/0237; A47G 9/0246
USPC ................ 43/114, 123, 107, 132.1, 121, 109; 5/482, 486, 495–497, 499, 501
See application file for complete search history.

(56) References Cited

U.S. PATENT DOCUMENTS

| 161,032 | A | * | 3/1875 | Hawkins | 43/123 |
| 738,674 | A | * | 9/1903 | Grattan | A47G 9/0246 5/496 |
| 924,733 | A | * | 6/1909 | Carswell, Sr. | A47G 9/0246 5/497 |
| 1,095,906 | A | * | 5/1914 | McCord | A01M 29/34 43/109 |
| 1,464,397 | A | * | 8/1923 | Royak | A47C 29/006 43/123 |
| 1,865,329 | A | * | 6/1932 | McHorter | A47G 9/02 5/497 |
| 2,069,036 | A | * | 1/1937 | Howard, Jr. | 5/499 |
| 2,603,798 | A | * | 7/1952 | Crescenzi | A47C 31/105 5/497 |
| 2,679,056 | A | * | 5/1954 | Simpson | A47G 9/0246 5/497 |
| 2,911,756 | A | * | 11/1959 | Geary | A01M 1/02 43/114 |
| 3,144,666 | A | * | 8/1964 | Ragsdale Mazera | A47G 9/0284 5/497 |
| 3,739,408 | A | * | 6/1973 | Pagels | A47G 9/0246 5/496 |
| 4,316,299 | A | * | 2/1982 | Friedman | A47G 9/02 5/497 |
| 4,800,671 | A | * | 1/1989 | Olson | A01M 1/18 43/114 |
| 4,862,638 | A | * | 9/1989 | Stevenson | A01M 1/14 43/114 |

(Continued)

FOREIGN PATENT DOCUMENTS

| EP | 947134 | A2 | * | 10/1999 | | A01M 1/14 |
| GB | 2180135 | A | * | 3/1987 | | A01M 1/14 |

(Continued)

*Primary Examiner* — Darren W Ark
(74) *Attorney, Agent, or Firm* — Wilson Daniel Swayze, Jr.

(57) ABSTRACT

A bed bug device to trap or stop bed bugs may include a substantially vertical back wall having a first layer of detachably connected adhesive to detachably attach to a bed, a top wall being connected to the vertical back wall to prevent a user from interfering with the operation of the bed bug device, a bottom wall being connected to the top wall, and a second adhesive being connected to the vertical back wall to trap the bed bugs. This bed bug device or a double sided adhesive tape or a slippery tape (one face is slippery and the other face is adhesive) may be stuck to a special mattress cover to generate an upside down rectangular prism box shaped bed bug device, so that bed bugs hiding anywhere in the bedroom may not be able to travel to the top of the bed.

1 Claim, 5 Drawing Sheets

(56) References Cited

U.S. PATENT DOCUMENTS

| | | | | |
|---|---|---|---|---|
| 5,155,950 | A * | 10/1992 | Burgeson | A01M 1/14 43/114 |
| 5,168,831 | A * | 12/1992 | Ittershagen | A01K 3/00 119/712 |
| 5,392,559 | A * | 2/1995 | Long | 43/121 |
| 5,414,954 | A * | 5/1995 | Long | 43/121 |
| 5,442,822 | A * | 8/1995 | Diaz | A47G 9/0246 5/497 |
| 5,465,440 | A * | 11/1995 | Heptner | A47G 9/0246 5/497 |
| 5,515,799 | A * | 5/1996 | Heptner | A47G 9/0246 5/495 |
| 5,561,941 | A * | 10/1996 | Long | 43/121 |
| 5,566,500 | A * | 10/1996 | Long | 43/121 |
| 5,966,759 | A * | 10/1999 | Sanders | A47C 27/007 5/497 |
| 6,892,404 | B2 * | 5/2005 | Harbin | A47G 9/0246 5/497 |
| 6,998,133 | B2 * | 2/2006 | Simpson | A01M 1/02 43/114 |
| 7,552,489 | B2 * | 6/2009 | Bell et al. | 5/499 |
| 7,802,334 | B1 * | 9/2010 | Larios | 5/726 |
| 8,371,064 | B2 * | 2/2013 | Watson | A01M 1/14 43/114 |
| 8,528,134 | B2 * | 9/2013 | Bell et al. | 5/499 |
| 8,615,826 | B2 * | 12/2013 | Michael | 5/482 |
| 8,707,615 | B2 * | 4/2014 | Cullen | 43/123 |
| 8,789,309 | B2 * | 7/2014 | Fabry | 43/123 |
| 2001/0001353 | A1 * | 5/2001 | Jones | 43/114 |
| 2004/0187377 | A1 * | 9/2004 | Gardner, Jr. | 43/114 |
| 2005/0235397 | A1 * | 10/2005 | Cosenza | A01M 1/14 2/242 |
| 2006/0283075 | A1 * | 12/2006 | Feldhege et al. | 43/114 |
| 2007/0193109 | A1 * | 8/2007 | Chyun | 43/114 |
| 2008/0032581 | A1 * | 2/2008 | Avery | B32B 27/12 442/394 |
| 2008/0052982 | A1 * | 3/2008 | Windsor | 43/114 |
| 2008/0305134 | A1 * | 12/2008 | Lucas | 5/484 |
| 2010/0043274 | A1 * | 2/2010 | Battick | 43/114 |
| 2010/0043275 | A1 * | 2/2010 | Battick | 43/114 |
| 2011/0067182 | A1 * | 3/2011 | Kussoff | A47C 31/007 5/698 |
| 2011/0113553 | A1 * | 5/2011 | Johan | A47C 31/007 5/499 |
| 2011/0311603 | A1 * | 12/2011 | Lucas | 5/482 |
| 2012/0096759 | A1 * | 4/2012 | Biggs | 43/123 |
| 2012/0096761 | A1 * | 4/2012 | Smith | 43/132.1 |
| 2012/0137433 | A1 * | 6/2012 | Snell | A47C 31/007 5/493 |
| 2012/0167309 | A1 * | 7/2012 | Heidorn | 43/123 |
| 2012/0210628 | A1 * | 8/2012 | Park et al. | 43/114 |
| 2012/0227313 | A1 * | 9/2012 | Mozeika et al. | 43/121 |
| 2013/0111671 | A1 * | 5/2013 | Smithson | A47C 27/122 5/690 |
| 2013/0263496 | A1 * | 10/2013 | Maloney et al. | 43/114 |
| 2013/0269238 | A1 * | 10/2013 | Bronk | 43/123 |
| 2013/0283671 | A1 * | 10/2013 | Czokajlo et al. | 43/114 |
| 2014/0013653 | A1 * | 1/2014 | Lander | 43/132.1 |
| 2014/0041285 | A1 * | 2/2014 | Russell | A01K 13/006 43/132.1 |
| 2014/0084774 | A1 * | 3/2014 | Phillips | A01M 1/2011 5/279.1 |
| 2014/0215897 | A1 * | 8/2014 | McAllister | A01M 29/34 43/132.1 |
| 2014/0359948 | A1 * | 12/2014 | Middlesworth | A47C 31/00 5/499 |
| 2015/0007485 | A1 * | 1/2015 | Hortel | A01M 1/023 43/114 |
| 2015/0096121 | A1 * | 4/2015 | Scarleski | A47C 21/028 5/499 |

FOREIGN PATENT DOCUMENTS

| | | | | | |
|---|---|---|---|---|---|
| JP | | 06000046 | A * | 1/1994 | A01M 1/14 |
| JP | | 08051910 | A * | 2/1996 | A01M 1/14 |
| JP | | 09322685 | A * | 12/1997 | A01M 1/14 |
| JP | | 11313592 | A * | 11/1999 | A01M 1/14 |
| JP | | 2000023611 | A * | 1/2000 | A01M 1/14 |
| JP | | 2002000155 | A * | 1/2002 | A01M 1/14 |
| JP | | 2003116441 | A * | 4/2003 | A01M 1/14 |
| JP | | 2005065630 | A * | 3/2005 | A01M 1/14 |
| JP | | 2006000086 | A * | 1/2006 | A01M 1/14 |
| JP | | 2006075025 | A * | 3/2006 | A01M 1/14 |
| JP | | 2007195507 | A * | 8/2007 | A01M 1/14 |
| WO | WO 9707673 | A1 * | | 3/1997 | A01M 1/14 |
| WO | WO 2005082140 | A1 * | | 9/2005 | A01M 1/14 |
| WO | WO 2010043995 | A1 * | | 4/2010 | A01M 1/14 |
| WO | WO 2011146663 | A2 * | | 11/2011 | |

* cited by examiner

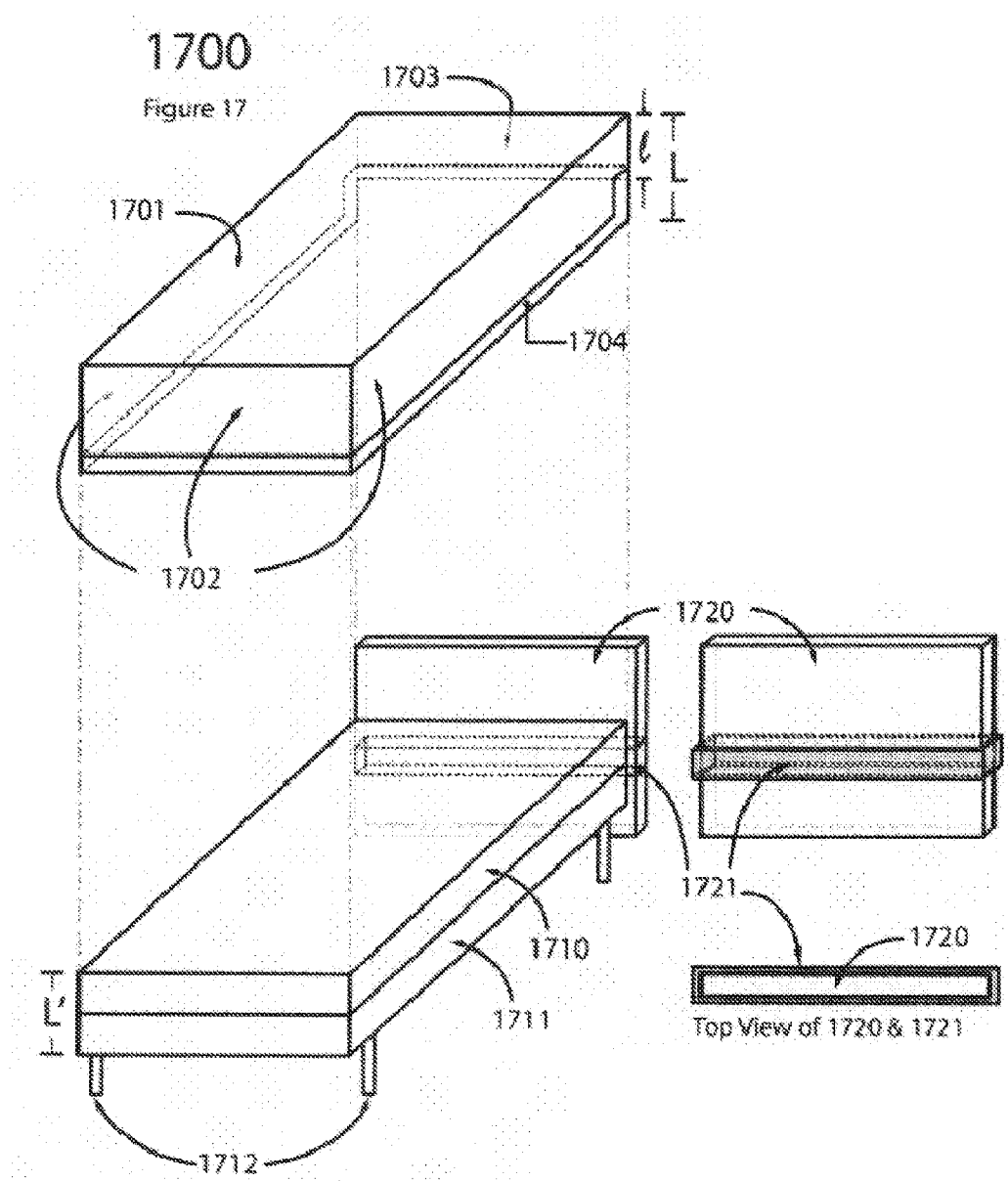

BED BUG TRAP OR BARRIER SURROUNDING A BED

FIELD OF THE INVENTION

The present invention relates to pest control, and more particularly to bed bug pest control.

BACKGROUND

Bed bugs are flat, oval, non-flying insects that may be commonly mistaken for ticks or small cockroaches; However, unlike these pests, adult bed bugs are usually reddish-brown and about the size of an apple seed. Bed bugs feast on human and animal blood, sucking the blood usually at night. They release a chemical as they bite through skin to numb the flesh. Humans may not know when they are being bitten. Bed bugs typically live in mattresses, bedding, headboards, bed frames and springs, couches, and other furniture, laying lots of tiny eggs and increasing the population extremely fast when source of blood is available.

Bed bugs are a national obsession because their population has jumped by 500% in the United States in just a few recent years. The current most well known methods are still not efficient to get rid of them.

Bed bugs were nearly wiped out in most areas in the 1940s and 1950s with the use of DDT, a toxic pesticide that has been banned. Without DDT, bed bugs are difficult to kill; modern extermination typically requires a multiple approach using heat (steam and a washer/dryer) and/or freezing cold, plus a variety of insecticides. These methods are not efficient for eliminating bed bugs. Hotels and resorts are at an extremely high risk of bed bug infestation. Bed bugs can be a particularly severe problem in apartment buildings where they spread from unit to unit.

Although only about one-third of people visibly react to bed bug bites (others are bit but nothing shows on their skin), most people realize that they have a bed bug infestation when they see bites on their skin and feel uncontrollably itchy, or when they notice small blood spots on linens, mattresses, or even walls near the bed.

A typical treatment is as follows. Homeowners or tenants are required to launder all clothing, bedding, and draperies; put all possessions in drawers and closets inside sealable bags or containers; move large furniture away from walls; vacuum and clean the rooms on treatment days; vacate the premises; and seal mattresses in mattress encasements (U.S. Pat. No. 7,849,543) because bed bugs inside mattress are difficult to deal with. The company hired to treat the building should treat all baseboards, picture frames, bed frames, dressers, drawers, and tables. Usually there is no guarantee to eliminate every bed bug in the room after the first treatment and multiple visits of professional services may be needed.

SUMMARY

A bed bug device to trap bed bugs may include a substantially vertical back wall having a first layer of detachably connected adhesive to detachably attach to a bed, a top wall being connected to the vertical back wall to prevent a user from interfering with the operation of the bed bug device, a bottom wall being connected to the top wall, and a second layer of adhesive being connected to the vertical back wall to trap the bed bugs. The top wall may be at an acute angle with respect to the horizontal. The bottom wall may be at an acute angle with respect to the horizontal. The top wall may be substantially horizontal, and the bottom wall may be substantially horizontal.

BRIEF DESCRIPTION OF THE DRAWINGS

The invention may be understood by reference to the following description taken in conjunction with the accompanying drawings, in which, like reference numerals identify like elements, and in which:

FIG. 15 illustrates a top view of the bed bug device of the present invention and the device is attached to a mattress cover or bed sheet.

FIG. 16 illustrates a top view of the bed bug device before it is stuck to the side of a bed.

FIG. 17 illustrates a perspective view of upside down rectangular prism box shaped bed bug device of the present invention.

DETAILED DESCRIPTION

Figure 1:
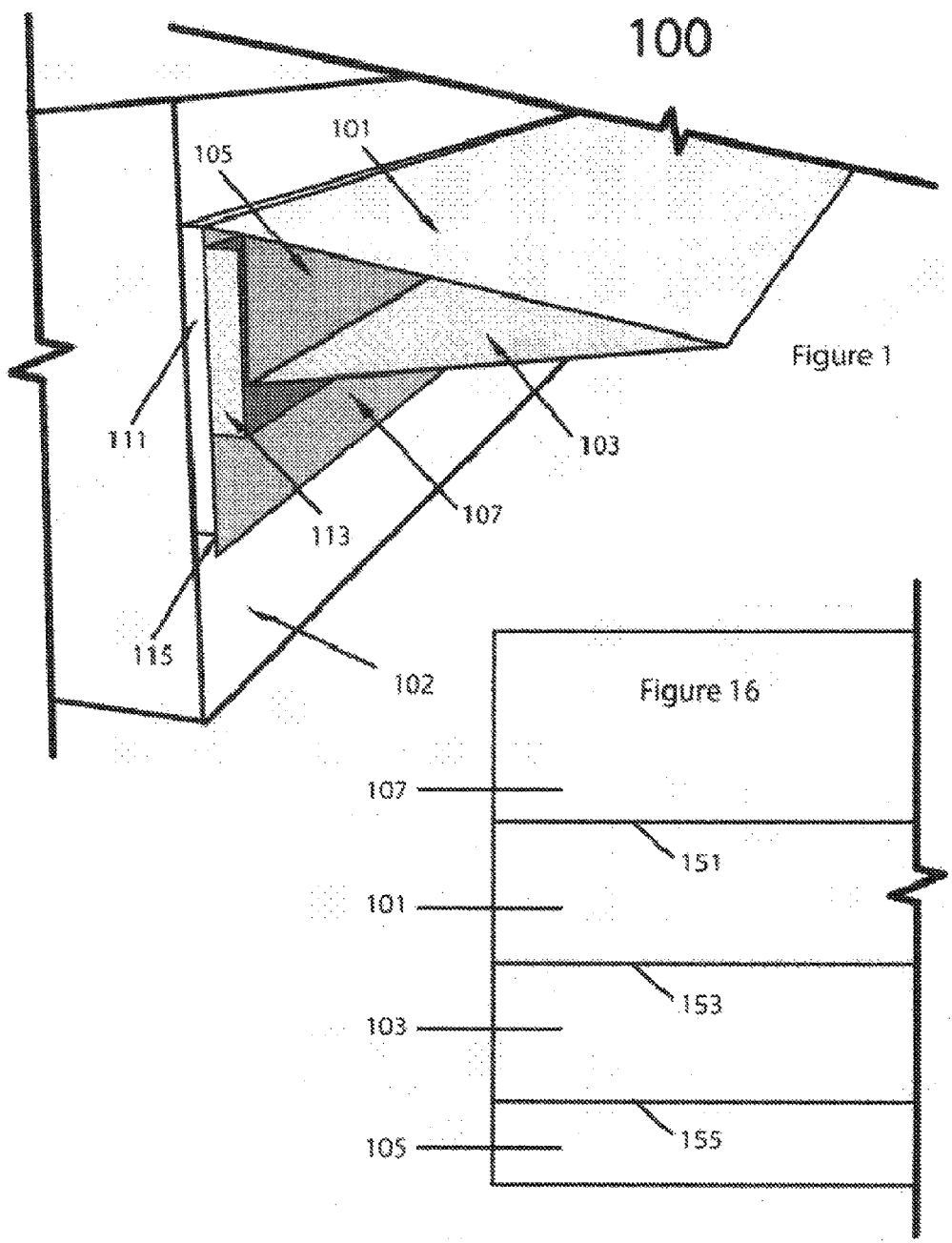
FIG. 1 illustrates a perspective view of the bed bug device of the present invention.

The object of present invention is to provide a device and a method to stop bed bug bite immediately after easy effort performable by homeowners or tenants. With present invention, bed bugs and sleeping people are separated by an adhesive trap or a slippery boundary surrounding entire bed. This design is better than the mattress encasement (U.S. patent application Ser. No. 12/498,863) which only prevents bed bugs inside of the mattress from attacking people. The present invention prevents bed bugs both inside and outside of the mattress from attacking people. With present invention, bed bugs can't contact sleeping people, but may be attracted by smell and temperature of sleeping people and caught by the adhesive trap boundary when they are on the way to attack sleeping people. This design with most attractive lure (smell of people) and bed sized large trap is better than commercially available trap which has a $CO_2$ gas generator and a heater to mimic human smell and body temperature, trying to attract bed bugs towards to an adhesive trap which is much smaller than the size of bed. With present invention, bed bugs not killed by the trap will die without food due to the adhesive trap or slippery boundary surrounding the entire bed, while all of traditional traps including that illustrated by U.S. patent application Ser. No. 12/229,013 don't have this unique function. With present invention, people can expect to stop bed bug bite immediately on the same day. At present, only high-cost method of heating entire house/rooms to temperature 45° C. for 1 hour by a special heating vehicle continually sending high flow of hot air into the house may meet this expectation.

The present invention may only require the minimal labor effort comparing with currently existing bed bug control methods. It may immediately achieve the goal of stopping bed bug bite completely which could only be achieved currently by the most expensive method of heating entire house.

A bed bug device 1700 with a shape similar to upside down rectangular prism box may include a rectangular horizontal top sheet and vertical surrounding sheets on the 4 sides connecting to the top sheet. Bed bugs may not penetrate through the device because it may not have any tiny holes. A slippery or adhesive band is connected to the bottom position of the surrounding sheets. This upside down rectangular prism box shaped device 1700 may cover a mattress and a box spring. Bed bugs can't travel across the slippery or adhesive band on the bottom or near bottom position of the device, therefore, any bed bugs hiding anywhere in a bedroom may not have any chance of crawling to the outside surface of the device, resulting in that bed bugs are not able to reach the top of the bed where people sleep at night.

Alternatively, the bed bug device 100 may be a tape or may be a wall device being attached to the 4 sides of the bed, generating a trap or a barrier surrounding the entire bed. Bed bugs may not pass through this tape or reach to the top area of the bed due to sticky adhesive or slippery coating. A person or quilt may touch the bed bug device, but the sticky adhesive coating may be out of reach. If the tape surrounding the periphery of the bed is touched by a dangling portion of a quilt at night, bed bugs may not still pass through this trap or barrier.

Since bed bugs suck blood as their only food and the bed bug device prevents bed bug from biting every night, all of the bed bugs in the bedroom will die from lack of food.

Adhesive material suitable for sticking to cloth may be coated on one side at a lower portion of the tape of device 100, and sticky adhesive material suitable for trapping bed bugs may be coated on the reverse side at the lower portion of the bed bug device 100. The bed bug device 100 may be substantially flat before use and the bed bug device 100 may include fold lines along the bed bug device 100 in order to aid in holding the bed bug device 100 properly. The fold lines may be weakened in order to aid in folding. After folding the bed bug device 100 at pre-folding positions, the bed bug device 100 may be in the shape of an inverted "L" (FIG. 1). The inverted L shaped tape may be attached to the sides of a bed. The advantage of inverted L shape is to prevent quilt and people from touching the sticky adhesive material on the bed bug device. When partial quilt dangles from a side of bed, the quilt may touch the tape, but will not touch the sticky adhesive material, and a bed bug may not evade across the bed bug device 100 by using the dangling part of the quilt. When people are walking beside the bed, their bodies can't touch the sticky adhesive material. The tape is made from paper or plastic and the hardness is similar to playing cards. The upside down L shaped tape can be bent if several top positions are cut (FIG. 2), allowing the tape to pivot yet remain joined together so that the tape can be applied to corners of a bed.

FIGS. 3 to 8 show the tapes with upside down L shape, which have the same function as the tape shown in FIG. 1, FIGS. 9 to 14 show the tapes with upside down U shape, which have the same function as the tape shown in FIG. 1.

The width of sticky material coating for trapping bed bugs may be approximately equal to or longer than an adult bed bug. For FIGS. 1 to 14, the adhesive coating may be similar to Scotch tape and may be applied to proper areas where the tapes need to stick to the mattress cover and where 2 surfaces are needed to be stuck together in order to form the bed bug device 100.

The locations of adhesive coating for trapping bed bugs shown in FIGS. 1 to 14 can be moved to any position where people or quilt can't accidentally touch. The locations of the adhesive coating for trapping bed bugs shown in FIGS. 1 to 14 can be replaced by very smooth or slippery surface because bed bugs can't crawl upward on a slippery surface.

One procedure of eliminating bud bugs is as follows: the bedding material may be first washed in hot water; all of cloth materials on top of bed are heated by a laundry dryer to kill the bugs and their eggs. A mattress cover or bed sheet without any tiny holes may be used to cover the mattress, so that a bed bug can't penetrate the mattress cover or bed sheet. The invented tape may be attached to the 4 sides (the perimeter) of the mattress cover or bed sheet. Usually at head side of the bed, the tape does not need to be bent to inverted L shape or U shape because this side is towards wall, and people or quilt may not touch the tape. Bed bugs hiding in any places in the bedroom can't reach the top of the bed at night because entire bed is continuously surrounded by the trap tape. Legs of a chair may be similarly protected by the tape. Before going to bed, leave the clothing on the protected chair, so that bed bugs can't have access to these clothing. People only select clothing or coats that they are going to ware in the near future to be heated by a laundry dryer and store the clothing in a sealed plastic bag and hang the coats on a closet bar which may be protected at both ends of the bar by the adhesive trap tape, so that bed bugs can't have access to these clothing and coats. Legs of furniture may be also protected by the trap tapes, so that bed bugs may not have chance to crawl from furniture to floor. This may result in no chance for bed bugs to suck blood from people, and the bed bugs will die without food.

FIG. 15 illustrates a top view of the bed bug device 100 of the present invention and illustrates a bed 102 which may include a mattress which may be covered by a sheet or a mattress cover which may not have any tiny holes, so that bed bugs may not be able to penetrate through the sheet or the cover. The bed bug device 100 may be detachably connected to the outer surface of the bed 102 for example by a first layer 111 of removable adhesive, and the bed bug device 100 may include a second layer 113 of adhesive to prevent the bed bug from moving once the bed bug has stepped on the second layer 113. The bug device 100 may extend around the periphery of the bed 102 in order to prevent the bed bugs from reaching the top surface or sleeping area of the bed 102.

FIG. 1 illustrates a first bed bug device 100 which may include a vertical back wall 107 which may include an outer surface 115 which may be connected to the first layer 111 of adhesive to detachably connect to the outer surface of the bed 102. The first layer 111 of adhesive may be removable adhesive in order to detachably connect to the outer surface of the bed 102.

All of the walls described below may be formed from foldable planar rigid material and may extend sufficiently.

The vertical back wall 107 may be foldably connected to a substantially horizontal top wall 101 to prevent the users (users of the bed 102) from reaching the second layer 113 of adhesive.

The horizontal top wall 101 may be foldably connected to an inclined (angled) bottom wall 103.

The inclined bottom wall 103 which may be at an acute angle with respect to the horizontal may be connected to a front vertical wall 105 which may extend to the bottom surface of the horizontal top wall 101.

The second layer 113 of adhesive may be sandwiched between the front vertical wall 105 and the vertical back wall 107, and a portion of the second layer 113 may be exposed and not covered by the front vertical wall 105 in order to provide an area for the bed bugs to become trapped on the second layer 113.

Figure 2:
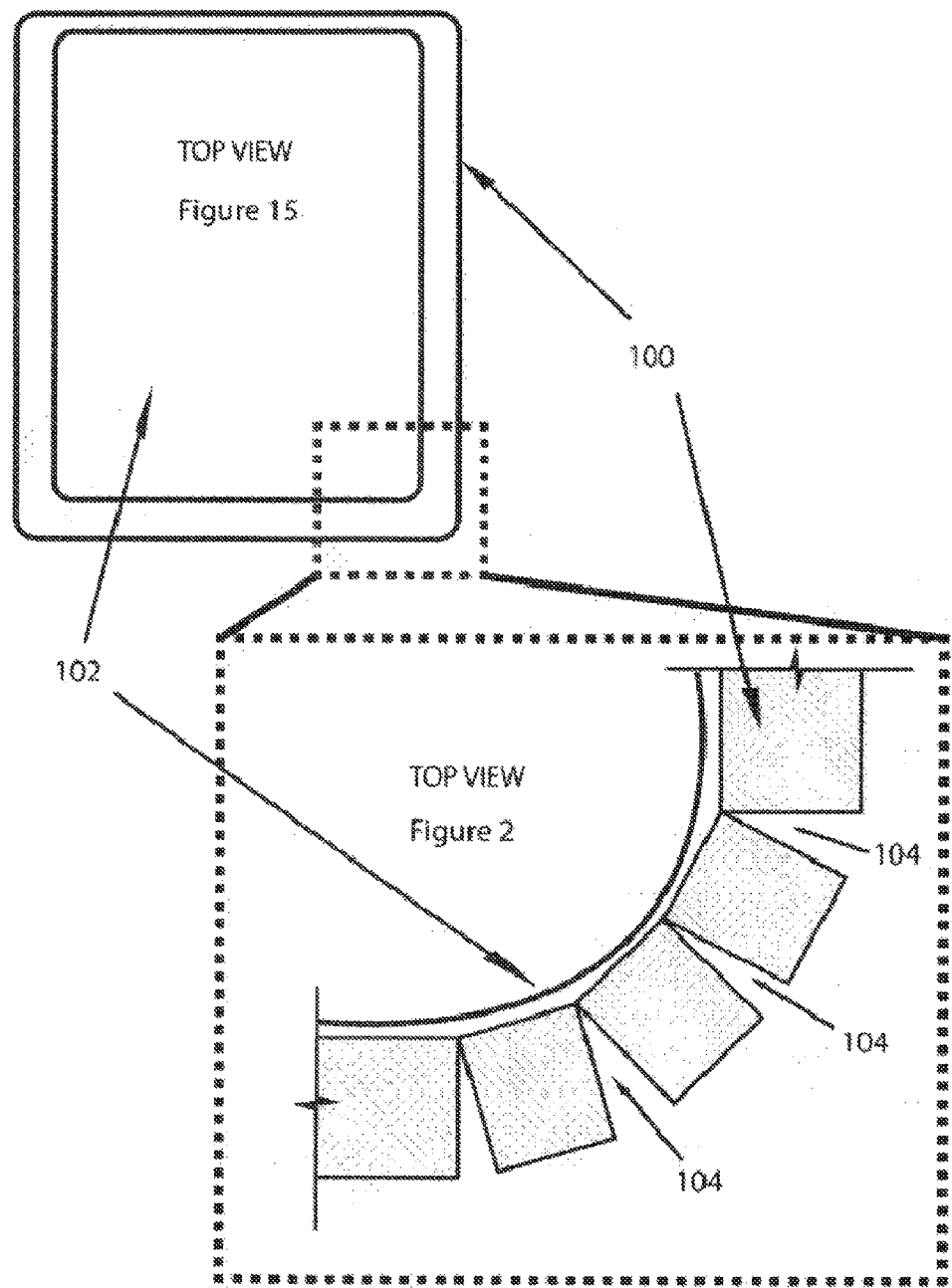
FIG. 2 illustrates a top view of the bed bug device of the present invention.

FIG. 2 illustrates a portion of the bed bug device 100 and illustrates that the bed bug device 100 has been sliced to create slots 104 to allow the bed bug device 100 extend around a corner of the mattress 102.

FIG. 16 illustrates the bed bug device in an unfolded position and illustrates a first fold line 151 between the vertical wall 107 and the top wall 101. FIG. 16 illustrates a second fold line 153 between the top wall 101 and the bottom wall 103 and illustrates a third fold line 155 between the bottom wall 103 and the vertical back wall 105.

Figure 3:
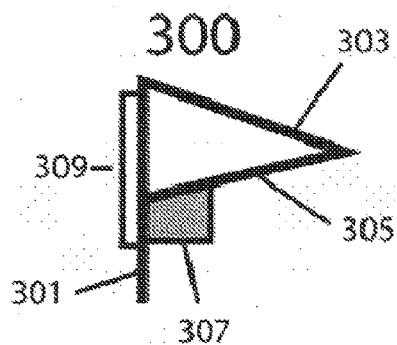
FIGS. 3-14 illustrates a side view of the bed bug device of the present invention.

FIG. 3 illustrates another bed bug device 300 which may include a vertical wall 301 being attached to the first layer 309 of adhesive and being connected to a top wall 303 which may be angled or inclined at an acute angle with respect to the horizontal and which may be connected to a bottom wall 305 which may be angled or inclined. The second layer 307 of adhesive may be connected to the vertical wall 301 and the bottom wall 305.

Figure 4:
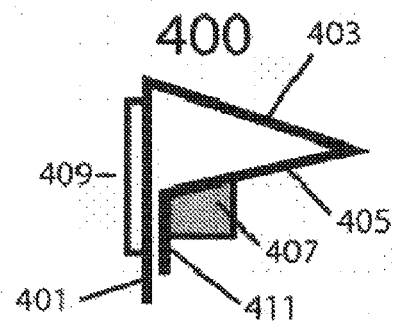

FIG. 4 illustrates another bed bug device 400 which may include a vertical wall 401 being attached to the first layer 409 of adhesive and being connected to a top wall 403 which may be angled or inclined at an acute angle with respect to the horizontal and which may be connected to a bottom wall 405 which may be angled or inclined at an acute angle with respect to the horizontal. The bottom wall 405 may be connected to a front vertical wall 411 which may extend downwards from the bottom wall 405. The second layer 407 of adhesive may be connected to the bottom wall 405 and the front vertical wall 411.

Figure 5:
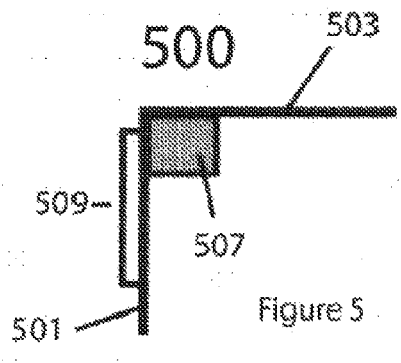

FIG. 5 illustrates another bed bug device 500 which may include a vertical wall 501 being attached to the first layer 509 of adhesive and being connected to a top wall 503 which may be horizontal. The second layer 507 of adhesive may be connected to the vertical wall 501 and the top wall 503.

Figure 6:
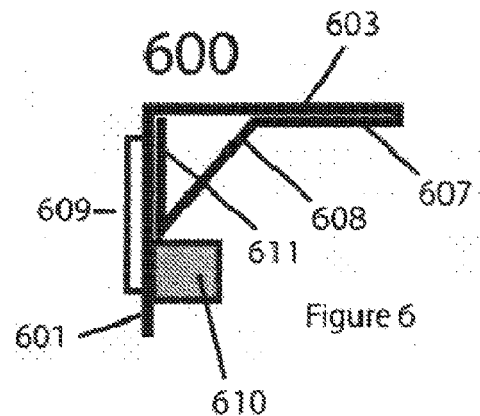

FIG. 6 illustrates another bed bug device 600 which may include a vertical wall 601 being attached to the first layer 609 of adhesive and being connected to a top wall 603 which may be horizontal. The top wall 603 may be connected to a horizontal bottom wall 607 which may be connected to an angled wall 608 at an acute angle with respect to the horizontal and which may be connected to a side vertical wall 611 which may extend to the top wall 603. The second layer 610 of adhesive may be connected to the vertical wall 601.

Figure 7:
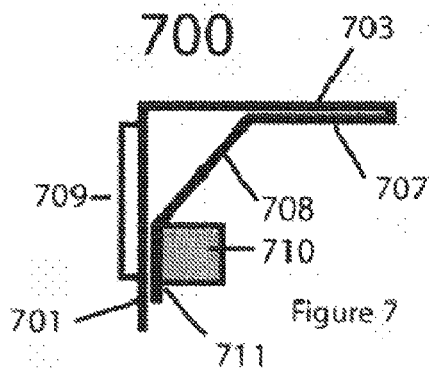

FIG. 7 illustrates another bed bug device 700 which may include a vertical wall 701 being attached to the first layer 709 of adhesive and being connected to a top wall 703 which may be horizontal. The top wall 703 may be connected to a horizontal bottom wall 707 which may be connected to an angled wall 708 at an acute angle with respect to the horizontal and which may be connected to a side vertical wall 711 which may extend downwards. The second layer 710 of adhesive may be connected to the side vertical wall 711.

Figure 8:
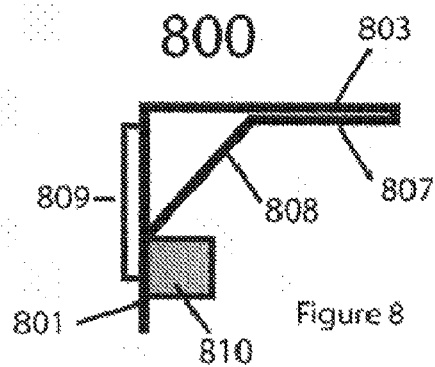

FIG. 8 illustrates another bed bug device 800 which may include a vertical wall 801 being attached to the first layer 809 of adhesive and being connected to a top wall 803 which may be horizontal. The top wall 803 may be connected to a horizontal bottom wall 807 which may be connected to an angled wall 808 at an acute angle with respect to the horizontal. The second layer 810 of adhesive may be connected to the opposing side of the vertical wall 801.

Figure 9:
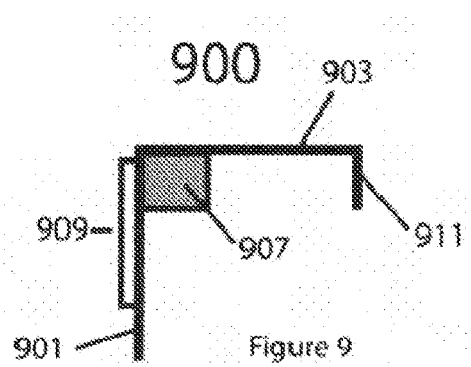

FIG. 9 illustrates another bed bug device 900 which may include a vertical wall 901 being attached to the first layer 909 of adhesive and being connected to a top wall 903 which may be horizontal. The second layer 907 of adhesive may be connected to the vertical wall 901 and the top wall 903 which may be connected to a vertical sidewall 911.

Figure 10:
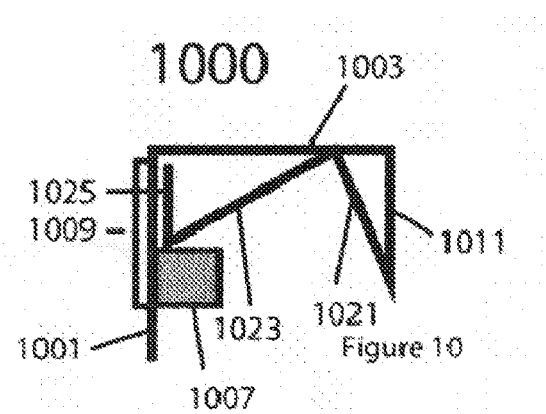

FIG. 10 illustrates another bed bug device 1000 which may include a vertical wall 1001 being attached to the first layer 1009 of adhesive and being connected to a top wall 1003 which may be horizontal. The top wall 1003 may be connected to a vertical sidewall 1011 which may be connected to a first angled bottom wall 1021 at an acute angle with respect to the horizontal and which may be connected to the bottom surface of the top wall 1003 and which may be connected to a second angled bottom wall 1023 at an acute angle with respect to the horizontal and which may be connected to the bottom surface of the top wall 1003. The second angled bottom wall 1023 may be connected to a second vertical sidewall 1025 which may extend upwards. The second layer 1007 of adhesive may be connected to the vertical wall 1001.

Figure 11:
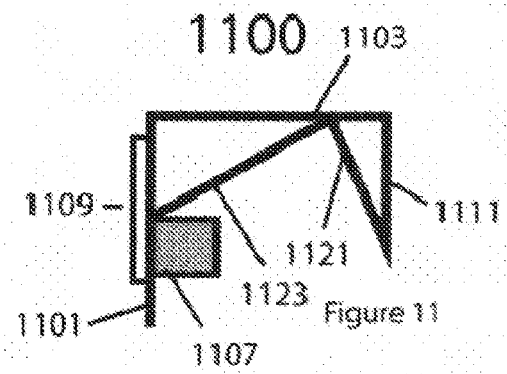

FIG. 11 illustrates another bed bug device 1100 which may include a vertical wall 1101 being attached to the first layer 1109 of adhesive and being connected to a top wall 1103 which may be horizontal. The top wall 1103 may be connected to a vertical sidewall 1111 which may be connected to a first angled bottom wall 1121 at an acute angle with respect to the horizontal and which may be connected to the bottom surface of the top wall 1103 and which may be connected to a second angled bottom wall 1123 at an acute angle with respect to the horizontal and which may be connected to the bottom surface of the top wall 1003. The second angled bottom wall 1123 may be connected to the vertical wall 1101. The second layer 1107 of adhesive may be connected to the vertical wall 1101.

Figure 12:
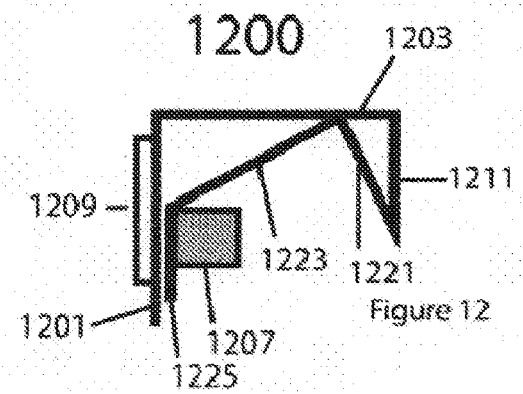

FIG. 12 illustrates another bed bug device 1200 which may include a vertical wall 1201 being attached to the first layer 1209 of adhesive and being connected to a top wall 1203 which may be horizontal. The top wall 1203 may be connected to a vertical sidewall 1211 which may be connected to a first angled bottom wall 1221 at an acute angle with respect to the horizontal and which may be connected to the bottom surface of the top wall 1203 and which may be connected to a second angled bottom wall 1223 at an acute angle with respect to the horizontal and which may be connected to the bottom surface of the top wall 1003. The second angled bottom wall 1223 may be connected to a second vertical sidewall 1225 which may extend downwards (or upwards which is not shown in the figure). The second layer 1207 of adhesive may be connected to the vertical wall 1225 or to the vertical wall 1201.

Figure 13:
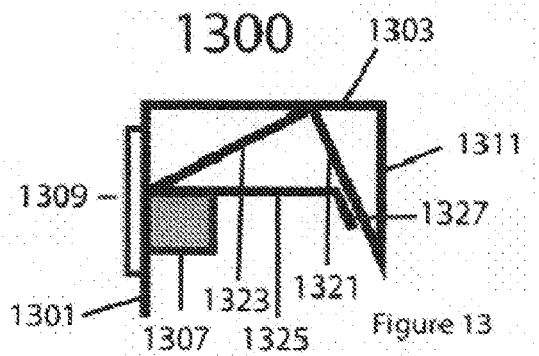

FIG. 13 illustrates another bed bug device 1300 which may include a vertical wall 1301 being attached to the first layer 1309 of adhesive and being connected to a top wall 1303 which may be horizontal. The top wall 1303 may be connected to a vertical sidewall 1311 and which may be connected to a first angled interior wall 1321 at an acute angle with respect to the horizontal and which may be connected to the bottom surface of the top wall 1303 and which may be connected to a second angled interior wall 1323 at an acute angle with respect to the horizontal and which may be connected to the bottom surface of the top wall 1303. The second angled interior wall 1323 may be connected to a horizontal bottom wall 1325 which may extend horizontally and may be connected to the vertical wall 1301. The horizontal bottom wall 1325 may be connected to a third inclined wall 1327 which may extend downwards (or upwards which is not shown in the figure). The second layer 1307 of adhesive may be connected to the vertical wall 1301 and the horizontal bottom wall 1325.

Figure 14:
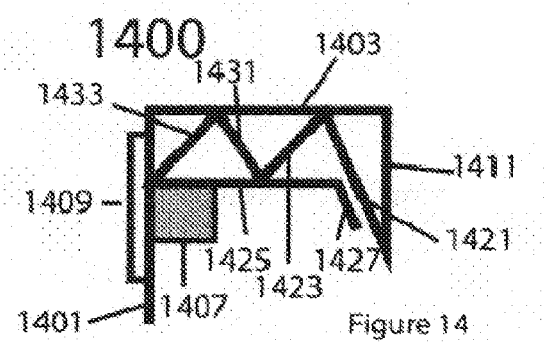

FIG. 14 illustrates another bed bug device 1400 which may include a vertical wall 1401 being attached to the first layer 1409 of adhesive and being connected to a top wall 1403 which may be horizontal. The top wall 1403 may be connected to a vertical sidewall 1411 and which may be connected to a first angled interior wall 1421 at an acute angle with respect to the horizontal and which may be connected to the bottom surface of the top wall 1403 and which may be connected to a second angled interior wall 1423 at an acute angle with respect to the horizontal and which may be connected to the bottom surface of the top wall 1403. The second angled interior wall 1423 may be connected to a third angled interior wall 1431 which may be angled at an acute angle with respect to the horizontal and may be connected to a fourth angled interior wall 1433 which may be angled at an acute angle with respect to the horizontal and may be connected to the top wall 1403 and may be connected to the horizontal bottom wall 1425 which may extend horizontally and may be connected to the vertical wall 1401. The horizontal bottom wall 1425 may be connected to a third inclined wall 1427 which may extend downwards (or upwards which is not shown in the figure). The second layer 1407 of adhesive may be connected to the vertical wall 1401 and the horizontal bottom wall 1425.

FIG. 17 illustrates a bed bug device 1700 which may be made from cloth or plastic or paper, and may include a top sheet 1701, side sheets 1702, shorted side sheet 1703, slippery band 1704 or adhesive band 1704. The slippery/adhesive band 1704 may be permanently coated on the bottom or near bottom position. The slippery/adhesive band 1704 may be coated on outside, or inside, or both outside and inside of side sheets 1702 and shorted side sheet 1703. The slippery/adhesive band 1704 may be generated by sticking a commercially available slippery tape (one face is slippery and the other face is adhesive) to side sheets 1703 and shorted side sheet 1704. The slippery/adhesive band 1704 may be replaced by bed bug device 100. The slippery/adhesive band 1704 may have the trap function by sticking a special double sided adhesive tape to side sheets 1702 and shorted side sheet 1703. For this special double sided adhesive tape, one side of coating is pressure sensitive adhesive which is similar to Scotch tape and the other side of adhesive coating is sticky enough to trap bed bugs. Currently, commercially available double sided tapes are not suitable for this application. As an example, highly sticky double sided insect trap tape such as flyer trap tape is not suitable for sticking it onto a surface of cloth or wood because it leaves adhesive residual after the tape is removed from the surface. As another example, double sided pressure sensitive adhesive tapes for installing carpet need applying pressure to generate sticky force, bed bugs' weights are very light and they can crawl on these pressure sensitive adhesive tapes. The length and width of the device 1700 are similar to those of a mattress 1710 and box spring 1711, so that the device 1700 may properly cover the mattress 1710 and box spring 1711. There is enough empty space between the mattress 1710 and bed head board 1720, so that a bed bug may not crawl from bed head board 1720 to the top of the bed. An optional method of applying slippery or adhesive tape 1721 to bed head board 1720 may be used to protect top position of bed head board 1720 from bed bugs. Bed legs 1712 support the box spring 1711.

The height (L) of side sheets 1702 may be longer than the total thickness (L') of mattress 1710 and box spring 1711. The slippery/adhesive band 1704 may be just above the floor. The lower the position of slippery band 1704 is, the lower possibility that a dangling portion of a quilt or a top bedding sheet may touch or cover the slippery/adhesive band 1704 and inference its function. The preferred position of slippery/adhesive band 1704 may be located between bottom of box spring 1711 and the floor, and the band 1704 may dangle in the air. In this case, very sticky adhesive material may be applied to the inside of side sheets 1702 for trapping bed bugs, while people may not be able to touch the inside adhesive coating from the outside of side sheet 1702. This application is especially suitable to hotels because travelers may not feel or notice any obvious difference comparing to normal hotel bedding sheet.

The height (l) of shorted side sheet 1703 may be slightly shorter than the total thickness (L') of mattress 1710 and box spring 1711, so that the slippery/trap band 1704 on the shorted side sheet 1703 may be at optimized vertical position.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:
1. An upside down rectangular prism box shaped bed bug device which covers a bed including a mattress and box spring comprising:
   a horizontal rectangular top sheet for the bed;
   three vertical side sheets for the bed having lower free edges, two of the three vertical side sheets both having front edges which extend transversely with respect to the lower free edges and extending on opposing sides of the device from each other;
   a vertical shorted side sheet for the bed which extends between the front edges of the two of the three vertical side sheets, the vertical shorted side sheet having a lower free edge and a height less than a height of the three vertical side sheets;
   a slippery band and/or an adhesive band attached to and located at the lower edges of each of the three vertical side sheets and the vertical shorted side sheet for the bed, the slippery and/or adhesive band surrounding the bed and being formed on an outside of the vertical side sheets and the shorted side sheet for the bed, or an inside of the vertical side sheets and the shorted side sheet for the bed, or to both the inside and the outside of the vertical side sheet sheets and the shorted side sheet for the bed, wherein the slippery band and/or adhesive band extends continuously without interruption along an entire perimeter defined by the lower edges of the three vertical side sheets and the vertical shorted side sheet for the bed.

\* \* \* \* \*